(12) United States Patent
Kimura

(10) Patent No.: US 8,031,038 B2
(45) Date of Patent: Oct. 4, 2011

(54) MAGNETIC FIXING DEVICE

(75) Inventor: Seiji Kimura, Hyogo (JP)

(73) Assignee: Pascal Engineering Corporation, Hyogo (JP)

( * ) Notice: Subject to any disclaimer, the term of this patent is extended or adjusted under 35 U.S.C. 154(b) by 163 days.

(21) Appl. No.: 12/449,231

(22) PCT Filed: Jun. 26, 2007

(86) PCT No.: PCT/JP2007/000693
§ 371 (c)(1),
(2), (4) Date: Jul. 29, 2009

(87) PCT Pub. No.: WO2008/105034
PCT Pub. Date: Sep. 4, 2008

(65) Prior Publication Data
US 2010/0013583 A1  Jan. 21, 2010

(30) Foreign Application Priority Data
Feb. 23, 2007  (WO) .................. PCT/JP2007/053405

(51) Int. Cl.
*H01F 7/20* (2006.01)
*H01F 1/00* (2006.01)
*H01H 47/00* (2006.01)

(52) U.S. Cl. ........ 335/285; 335/286; 335/287; 335/289; 335/290; 335/291; 335/294; 335/295; 335/296; 335/299; 335/302; 361/143; 361/144; 361/145

(58) Field of Classification Search .................. 335/229, 335/230, 284–299, 302–306; 361/143–145, 361/149–151, 267
See application file for complete search history.

(56) References Cited

U.S. PATENT DOCUMENTS

| 3,025,512 | A | * | 3/1962 | Bloechl | 340/815.86 |
| 3,722,360 | A | * | 3/1973 | Blakey et al. | 409/131 |
| 4,090,162 | A | * | 5/1978 | Cardone et al. | 335/289 |
| 4,128,825 | A | * | 12/1978 | Madsen | 335/272 |
| 4,507,635 | A | * | 3/1985 | Cardone et al. | 335/291 |
| 4,684,112 | A | * | 8/1987 | Chernikov et al. | 269/8 |
| 4,847,582 | A | * | 7/1989 | Cardone et al. | 335/289 |
| 4,956,625 | A | * | 9/1990 | Cardone et al. | 335/290 |
| 4,965,695 | A | * | 10/1990 | Baumann | 361/142 |
| 5,047,742 | A | * | 9/1991 | Hsu | 335/289 |
| 6,104,270 | A | * | 8/2000 | Elias | 335/289 |

(Continued)

FOREIGN PATENT DOCUMENTS
JP  2003-184370  7/2003
(Continued)

*Primary Examiner* — Anh Mai
*Assistant Examiner* — Mohamad Musleh
(74) *Attorney, Agent, or Firm* — Jordan and Hamburg LLP

(57) ABSTRACT

The magnetic fixing device comprises a clamping plate having a fixing surface to which a clamping object is fixed and plural magnetic force generation mechanisms. The magnetic force generation mechanisms each comprise a magnetic material member facing the fixing surface, plural permanent magnets arranged around the outer periphery of the magnetic material member, a first Alnico magnet placed on the back of the magnetic material member, and a first coil for switching the polarity of the first Alnico magnet, and can be switched between the absorption state in which the clamping object is adsorbed and the non-absorption state in which the clamping object is not adsorbed. An operation state indication mechanism capable of presenting an indicator indicating that the plural magnetic force generation mechanisms are in the absorption state or in the non-absorption state is provided on the fixing surface or outer periphery of the clamping plate.

14 Claims, 13 Drawing Sheets

U.S. PATENT DOCUMENTS 6,489,871 B1 * 12/2002 Barton ............................ 335/285
6,636,153 B1 * 10/2003 Barton et al. ................... 340/680
7,038,566 B2 *  5/2006 Cardone ......................... 335/289
7,782,164 B2 *  8/2010 Tiberghien et al. ............ 335/285

FOREIGN PATENT DOCUMENTS

| JP | 2004249481 A * | 9/2004 |
| JP | 2005-118908 | 5/2005 |
| JP | 2005-515080 | 5/2005 |
| JP | 2005-169840 | 6/2005 |
| JP | 2005169840 A * | 6/2005 |
| WO | WO-03/009972 | 2/2003 |

* cited by examiner

MAGNETIC FIXING DEVICE

TECHNICAL FIELD

The present invention relates to a magnetic fixing device installed in the clamping plate of, for example, an injection molding machine and particularly to a magnetic fixing device having a structure enabling the operator to easily know whether plural magnetic force generation mechanisms adsorbing a clamping object is in the adsorption state or in the non-adsorption state.

BACKGROUND TECHNOLOGY

Traditionally, in an injection molding machine, a metal mold (a fixed mold and a movable mold) is fixed on a platen such as a stationary platen and a movable platen and the movable platen is moved toward/away from the stationary platen to close/open the mold. With the mold closed, molten synthetic resin is injected in the cavity of the mold to form a molded article. Then, the mold is opened and the molded article is ejected by an ejector mechanism.

Here, the mold is fixed to the platen of an ejection molding machine using plural bolts or a hydraulic clamping device in many cases. Recently, magnetic fixing devices have been put into practical use, in which a clamping plate (magnet plate) in which plural magnetic force generation mechanisms are installed is attached to the platen and magnetic force is used to adsorb and fix the mold onto the fixing surface of the clamping plate.

In the injection molding machine of Patent Document 1, clamping plates in each of which plural magnet units (magnetic force generation mechanisms) are installed are fixed to the stationary platen and movable platen, respectively, and the magnetic force generated by the plural magnet units is used to fix the molds to the fixing surfaces of the clamping plates. The magnet units each have a steel block, plural permanent magnets arranged on the outer periphery of the steel block, an Alnico magnet placed on the back of the steel block, and a coil wound around the outer periphery of the Alnico magnet. The magnetic field direction of the Alnico magnet is reversed in accordance with the energizing direction of the coil.

For fixing a mold to the fixing surface of a clamping plate, the magnet units are powered from the control unit through operation using the operation panel. The coil is energized for several seconds to switch the magnetic field direction (polarity) of the Alnico magnet so that the Alnico magnet and permanent magnets together establish a magnetic circuit of which the magnetic path is partly formed by the mold, obtaining an adsorption state in which the magnet units adsorb the mold.

On the other hand, for releasing the mold, the operation panel is operated to energize the coil for several seconds in the opposite direction to that for adsorbing the mold to switch the polarity of the Alnico magnet so that a magnetic circuit of which the magnetic path does not include the mold in any part is established, whereby the non-adsorption state in which the magnet units do not adsorb the mold is obtained.

Patent Document 1: Japanese Laid-Open Patent Publication No. 2005-169840.

DISCLOSURE OF THE INVENTION

Problems to be Solved by the Invention

The prior art magnetic fixing device has the problem that the operation panel is the only place where an indication that the magnet units are in the absorption state or in the non-absorption state is presented; therefore, it is not easy for an operator to know whether the plural magnet units are in the adsorption state or in the non-adsorption state after the molds are fixed or after the molds are released.

The injection molding machine has an operation panel and control unit for attaching/detaching molds. The operation panel and control unit are used only for energizing the plural magnet units for several seconds to exchange the molds. They are not used for other purposes. Then, it is possible for plural injection molding machines to share a set of operation panel and control unit instead of providing each injection molding machine with an operation panel and control unit for attaching/detaching molds. In such a case, it is not easy for the operator to know whether the plural magnet units are in the adsorption state or in the non-adsorption state in an injection molding machine disconnected from the operation panel and control unit.

The object of the present invention is to provide a magnetic fixing device having plural magnetic force generation mechanisms installed in a clamping plate wherein it is easily known in the vicinity of the clamping plate whether the magnetic force generation mechanisms are in the adsorption state or in the non-adsorption state. Another object of the present invention is to provide a magnetic fixing device wherein it is easily known whether the magnetic force generation mechanisms are in the adsorption state or in the non-adsorption state even if the operation panel and control unit are disconnected.

Means to Solve the Problem

The present invention relates to a magnetic fixing device comprising a clamping plate having a fixing surface fixing a clamping object such as a mold and plural magnetic force generation mechanisms installed in the clamping plate for fixing the clamping object to the fixing surface by magnetic force, characterized in that each of the magnetic force generation mechanisms comprises a magnetic material member facing the fixing surface, plural permanent magnets arranged around an outer periphery of the magnetic material member, a first Alnico magnet provided on a back of the magnetic material member, and a first coil for switching a polarity of the first Alnico magnet, and can be switched between an absorption state in which the clamping object is adsorbed and the non-absorption state in which the clamping object is not adsorbed, and an operation state indication mechanism capable of presenting an indicator indicating that the plural magnetic force generation mechanisms are in the adsorption state or in the non-adsorption state is provided on the fixing surface or outer periphery of the clamping plate.

Advantages of the Invention

The magnetic fixing device of the present invention has the operation state indication mechanism capable of presenting an indicator indicating that the plural magnetic force generation mechanisms are in the adsorption state or in the non-adsorption state on the fixing surface or outer periphery of the clamping plate. Thus, it is easily known in the vicinity of the clamping plate whether the magnetic force generation mechanisms are in the adsorption state or in the non-adsorption state.

In the case where a set of operation panel and control unit for attaching/detaching molds is shared by plural magnetic fixing devices, the operator can easily know whether the magnetic force generation mechanisms are in the adsorption state or in the non-adsorption state even if the magnetic fixing device is disconnected from the operation panel and control unit.

In addition to the above constitutions, the present invention can have the following constitutions.

(1) The operation state indication mechanism comprises a casing member installed in the clamping plate, a transparent cover member closing the front of the casing member, a first housing pit formed in the casing member, a second Alnico magnet housed in the first housing pit, a second coil wound around the second Alnico magnet, and a movable indication member consisting of a permanent magnet housed in a second housing pit formed in the casing member on the front side of the first housing pit, and an energizing circuit that energizes the second coil only while the plural first coils of the plural magnetic force generation mechanisms are energized is provided.

(2) The movable indication member is made of a disc-shaped permanent magnet that can be turned around in the second housing pit and the indicators are provided on the end faces of the disc-shaped permanent magnet.

(3) The movable indication member is made of a cylindrical permanent magnet that can be turned around in the second housing pit, the indicators are provided on the end faces of the cylindrical permanent magnet, and a pin member rotatably supporting the cylindrical permanent magnet in the longitudinal midpoint is provided.

(4) The movable indication member is made of a cylindrical permanent magnet housed in the second housing pit in the manner that it is axially movable by a predetermined stroke and the indicators are provided on the end faces of the cylindrical permanent magnet. (5) The magnetic fixing device is mounted on a platen of an injection molding machine.

Figure 1:
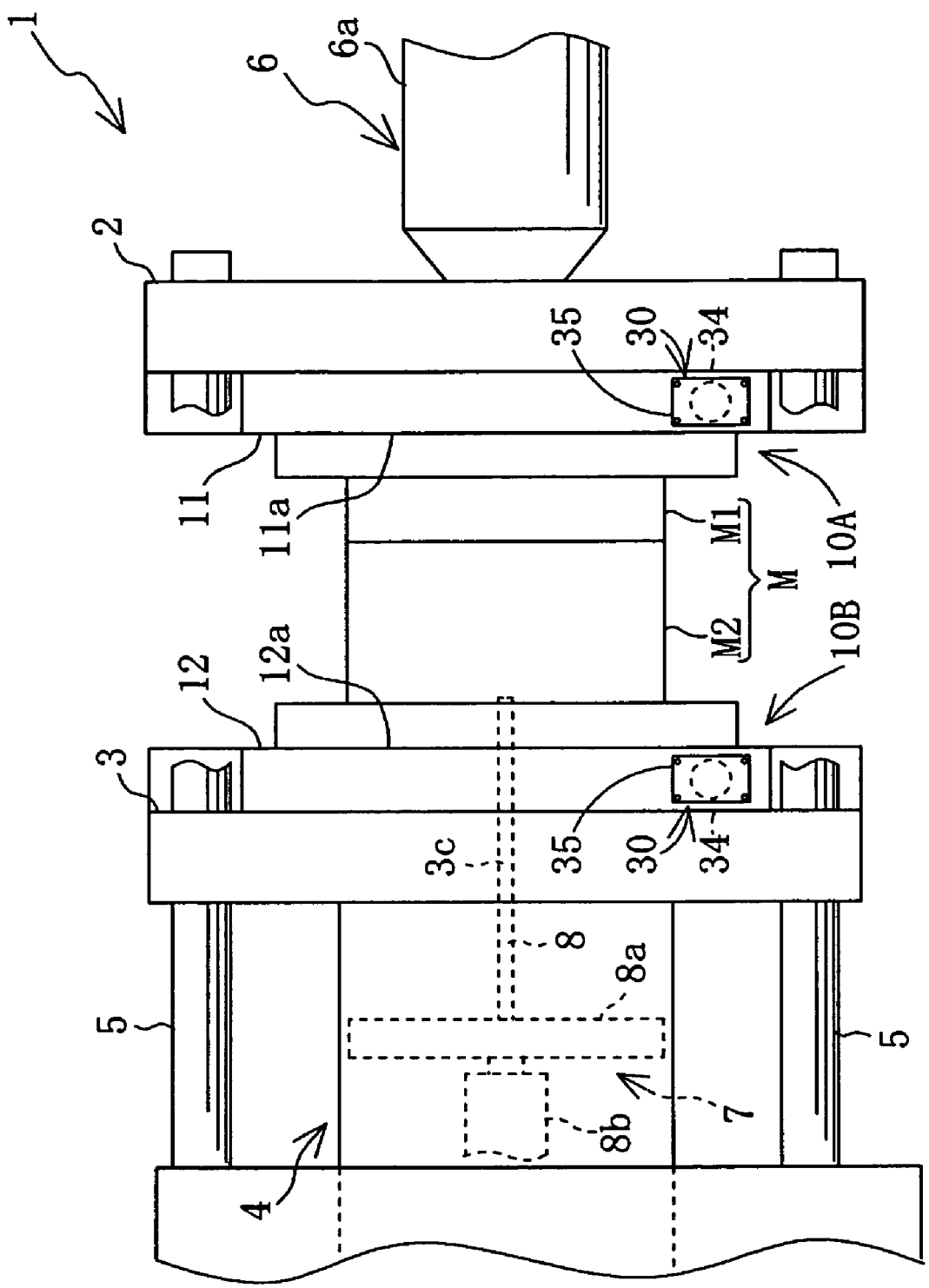
FIG. 1 is a front view of the essential part of an injection molding machine of Embodiment 1 of the present invention and a mold.

DESCRIPTION OF NUMERALS 1 injection molding machine
2 stationary platen
3 movable platen
10A, 10B, 10C magnetic fixing device
11, 12, 60 clamping plate
13 magnet unit
20 steel block
21 first Alnico magnet
22 first coil
23 permanent magnet
30, 30A-30G, 50 operation state indication mechanism
31 casing member
31a first housing pit
32 second Alnico magnet
33 second coil
34, 36, 39, 40 movable indication member
34a, 36a red indication surface
34b, 36b white indication surface
35, 41 cover member
37 pin member
39a, 40a red indication surface
39b white indication surface
42 indicator rod

BEST MODES FOR IMPLEMENTING THE INVENTION

Best modes for implementing the present invention will be described hereafter with reference to the drawings.

Embodiment 1

The present invention is applied to an injection molding device in this embodiment. Therefore, an injection molding machine 1 will be first described. As shown in FIG. 1, the injection molding machine 1 comprises a stationary platen 2 and a movable platen 3 facing each other for fixing a metal mold M (a fixed mold M1 and a movable mold M2) as a clamping object, a platen drive mechanism 4 having a hydraulic cylinder (or drive motor) driving the platen 3 toward/away from the platen 2 for closing/opening the mold M, four guide rods 5 guiding and supporting the platen 3 movably toward/away from the platen 2, an injection mechanism 6 having an injection cylinder 6a for injecting molten synthetic resin in the cavity of the mold M in the closed state, and an eject mechanism 7 ejecting the molded article from the mold M.

For injection molding using the injection molding machine 1, the platen drive mechanism 4 drives the platen 3 toward the platen 2 so that the mold M2 is pressed against the mold M1, whereby the mold is closed. In this state, the molten synthetic resin is injected in the mold M from the tip of the injection cylinder 6a to form a molded article. Then, the platen drive mechanism 4 drives the platen 3 away from the platen 2, whereby the mold is opened. In this state, the molded article is ejected from the mold M2 by the eject mechanism 7.

The eject mechanism 7 comprises ejector pins 8, an ejector plate 8a, and a fluid-pressure cylinder 8b reciprocating the ejector pins 8 via the ejector plate 8a. The ejector pins 8 are inserted in ejector pin holes 3c.

Figure 2:
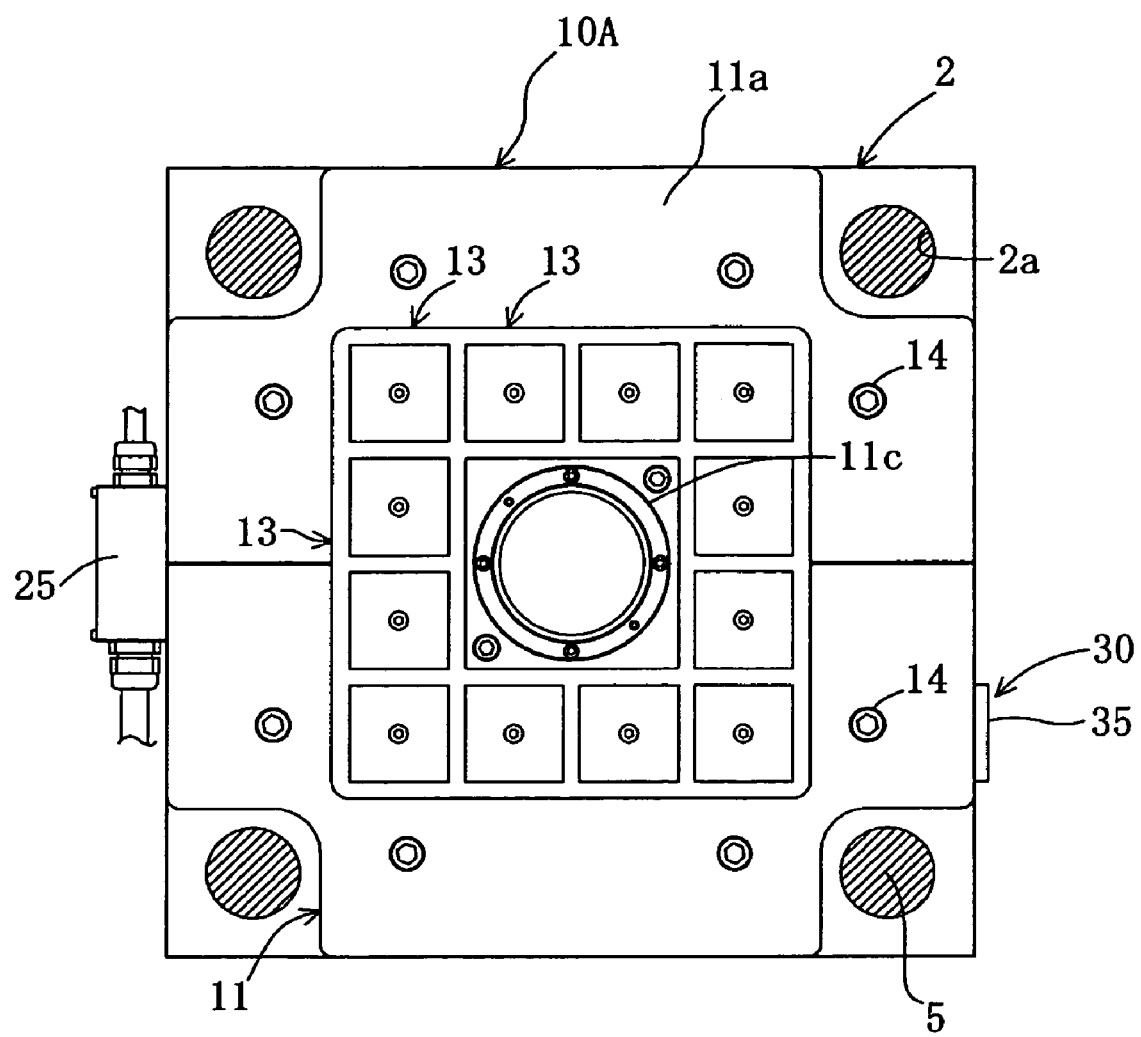
FIG. 2 is a side view of the stationary platen and clamping plate.
Figure 3:
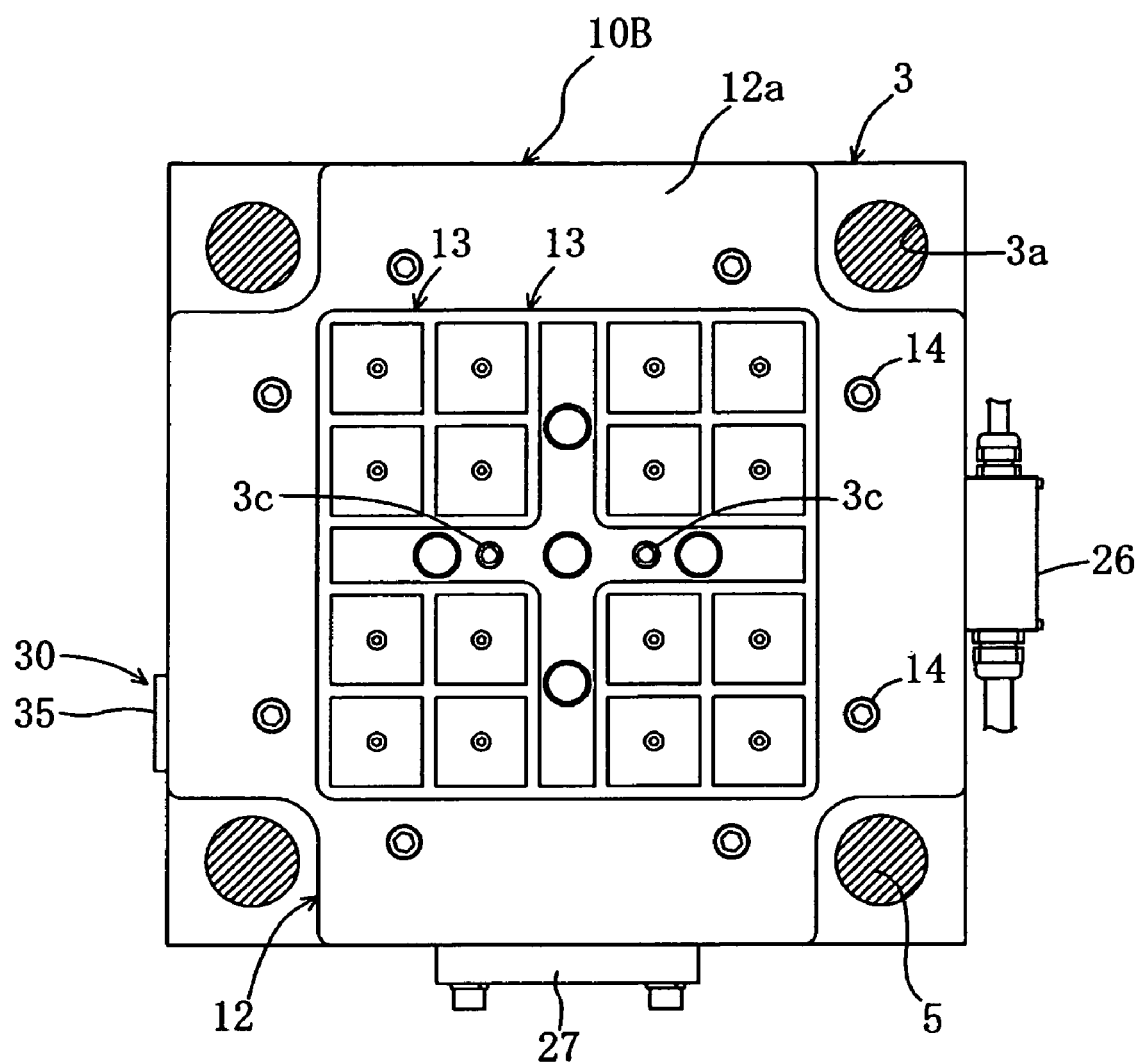
FIG. 3 is a side view of the movable platen and clamping plate.
Figure 4:
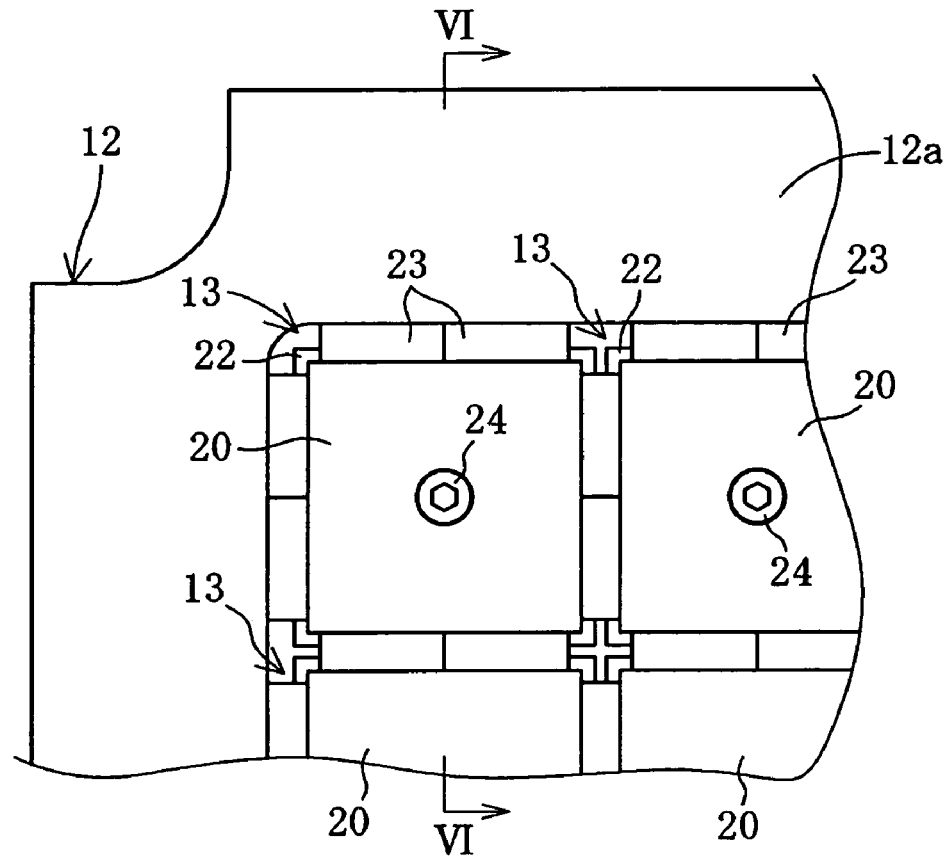
FIG. 4 is a side view of the essential part of the clamping plate and the magnet unit.
Figure 5:
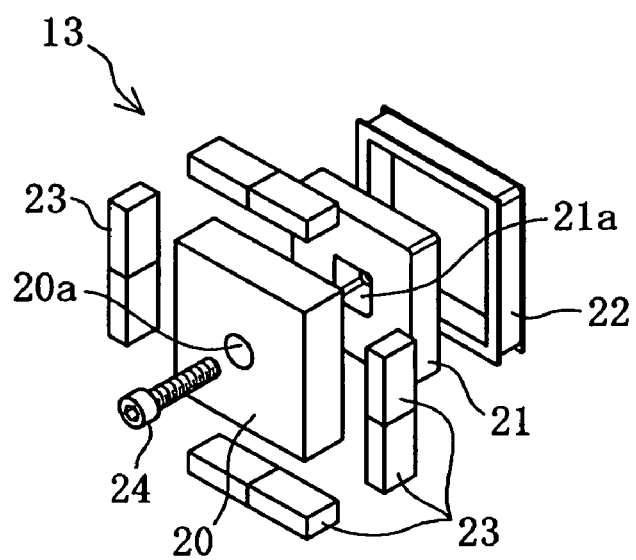
FIG. 5 is an exploded perspective view of a magnet unit.

As shown in FIGS. 1 to 3, the platens 2 and 3 each have a square form in the side view. The four guide rods 5 are inserted and fixed in the insert holes 2a of the platen 2 near the four corners. The four guide rods 5 are slidably inserted in the insert holes 3a of the platen 3 near the four corners, guiding the platen 3 toward/away from the platen 2.

A magnetic fixing device 10A fixing the mold M1 to the platen 2 and a magnetic fixing device 10B fixing the mold M2 to the platen 3 will be described hereafter.

As shown in FIGS. 1 to 3, the magnetic fixing device 10A comprises a clamping plate 11 having a fixing surface ha for fixing the mold M1 to the platen 2, plural magnet units 13 (magnetic force generation mechanisms) provided in the clamping plate 11 and generating adsorptive power for fixing the mold M1 to the fixing surface 11a by magnetic force, and an operation state indication mechanism 30 provided on the front end (outer periphery) of the clamping plate 11. The operation state indication mechanism 30 presents an indication that the plural magnet units 13 are in the adsorption state or in the non-adsorption state.

The magnetic fixing device 10B comprises a clamping plate 12 having a fixing surface 12a for fixing the mold M2 to the platen 3, plural magnet units 13 (magnetic force generation mechanisms) provided in the clamping plate 12 and generating adsorptive power for fixing the mold M2 to the fixing surface 12a by magnetic force, and an operation state indication mechanism 30 provided on the front end (outer periphery) of the clamping plate 12. The operation state indication mechanism 30 presents an indication that the plural magnet units 13 are in the adsorption state or in the non-adsorption state.

The clamping plate 11 is a steel plate made of a magnetic material nearly equal to the platen 2 in size with nearly square portions corresponding to the four corners of the platen 2 being removed. The clamping plate 11 is fixed to the surface of the platen 2 by plural bolts 14.

The clamping plate 12 is a steel plate made of a magnetic material nearly equal to the platen 3 in size with nearly square portions corresponding to the four corners of the platen 3 being removed. The clamping plate 12 is fixed to the surface of the platen 3 by plural bolts 14.

As shown in FIGS. 1 and 2, the clamping plate 11 is provided with a connector 25 to which plural electric lines can be connected/disconnected on the rear end and a locating ring 11c in the center. The connector 25 is used to connect electric lines powering the plural magnet units 13. The locating ring 11c is engaged with the locating ring (not shown) of the mold M1 for centering the mold M1 on the fixing surface 11a.

As shown in FIGS. 1 to 3, the clamping plate 12 is provided with a connector 26 to which plural electric lines can be connected/disconnected on the rear end, a safety catcher block 27 for preventing the mold M2 from falling on the bottom end, and a pair of ejector pin holes 3c in the center. The connector 26 has the same function as the connector 25. Here, the mold M is carried in/out by a known transfer means for replacing the mold M.

The magnet unit 13 will be described next.

Plural magnet units 13 are installed in the clamping plates 11 and 12 in different arrangements. For example, as shown in FIG. 2, four magnet unit sets each consisting of three magnet units 13 arranged next to each other on the top and bottom or on the right and left, a total of 12 magnet units 13, are installed in the clamping plate 11 fixed on the stationary platen 2 at positions symmetrical about the center of the clamping plate 11.

As shown in FIG. 3, four first magnet unit sets each consisting of four magnet units 13 arranged next to each other on the top and bottom or on the right and left, a total of 16 magnet units 13, are placed in the clamping plate 12 fixed to the movable platen 3 at positions symmetrical about the center of the clamping plate 11. Here, plural magnet units 13 are arranged according to the shape and size of the clamping plate 11 and the shape and size of the mold M. Since the magnet units 13 have the same structure, the magnet units 13 provided on the clamping plate 12 will be described.

As shown in FIGS. 4 to 7, the magnet unit 13 has a steel block 20 (magnetic material member) made of a magnetic material facing the fixing surface 12, a first Alnico magnet 21 fitted on the back of the steel block 20, a first coil 22 wound around the first Alnico magnet 21 for switching the polarity of the first Alnico magnet, plural (for example eight) neodymium permanent magnets 23 arranged around the outer periphery of the steel block 20. The magnet unit 13 can be switched between the adsorption state in which the magnet unit 13 adsorbs the mold M2 and the non-adsorption state in which the magnet unit 13 does not adsorb the mold M2. Here, the permanent magnets 23 between adjacent magnet units 13 are shared by them.

The steel block 20 and first Alnico magnet 21 have a square shape. The steel block 20 has a bolt hole 20a and the first Alnico magnet 21 has a hole 21a. The first Alnico magnet 21 and first coil 22 fitted in a recess 12b are interposed between the steel block 20 and the bottom wall 12c of the clamping plate 12. Then, they are fastened to the clamping plate 12 by a hexagon socket head bolt 24 made of a nonmagnetic material (for example SUS304) inserted in the bolt hole 20a and hole 21a. The plural permanent magnets 23 are fixed to the steel block 20 or clamping plate 12 by some fixing means.

Figure 6:
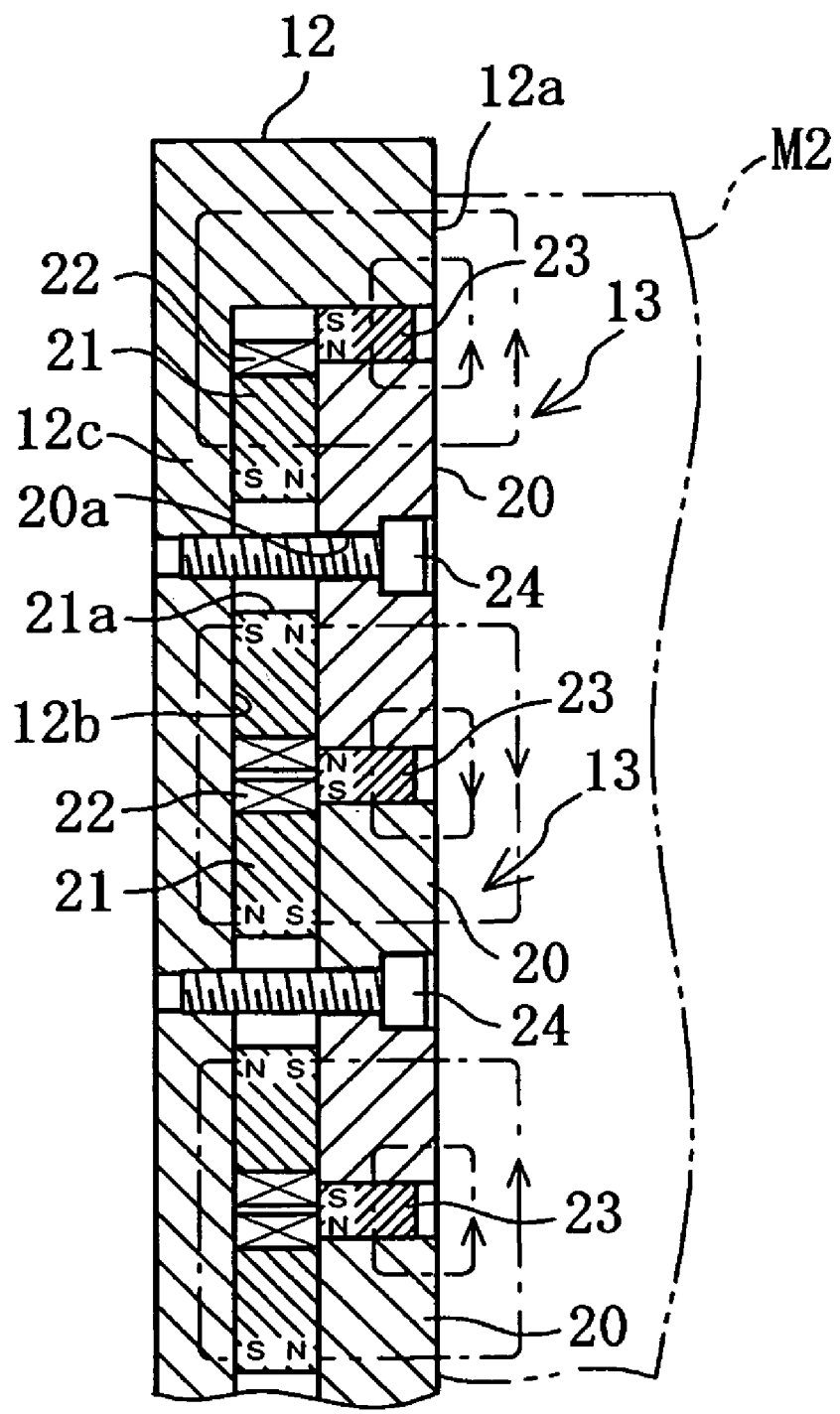
FIG. 6 is a cross-sectional view of the clamping plate (in the adsorption state) provided to the platen.

As shown in FIG. 6, the polarities of the permanent magnets 23 on the steel block 20 of one of two adjacent magnet units 13 and the polarities of the permanent magnets 23 on the steel block 20 of the other magnet unit 13 are reversed to each other. The polarity of the first Alnico magnet 21 can be reversed by magnetic induction of a magnetic field generated by the first coil 22. The polarity of the Alnico magnet 21 of one of two adjacent magnet units 13 and the polarity of the Alnico magnet 21 of the other of two adjacent magnet units 13 are reversed to each other.

The operation state indication mechanism will be described next.

As shown in FIGS. 1 to 3, the operation state indication mechanisms 30 are provided on the front ends of the clamping plates 11 and 12. Since they have basically the same structure, the operation state indication mechanism 30 provided to the clamping plate 12 will be described.

Figure 8:
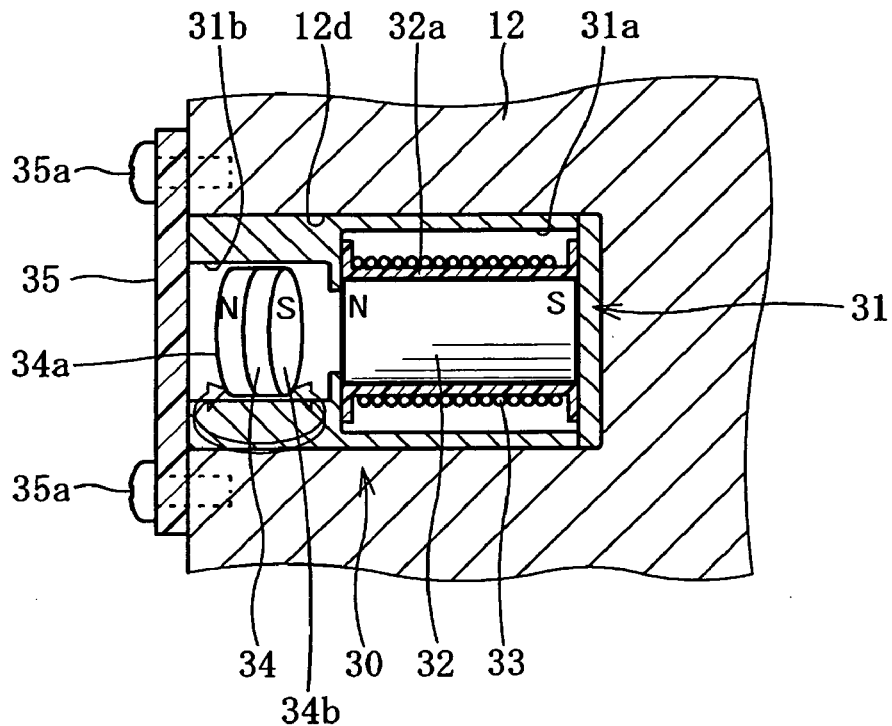
FIG. 8 is a cross-sectional view of the operation state indication mechanism (in the adsorption state) provided to the clamping plate.

As shown in FIG. 8, the operation state indication mechanism 30 has a steel casing member 31 installed in the clamping plate 12, a cover member 35 made of a transparent acrylic resin plate closing the front of the casing member 31, a first housing pit 31a formed in the casing member 31, a second cylindrical Alnico magnet 32 housed in the first housing pit 31a, a synthetic resin coil bobbin 32a fitted on the second Alnico magnet 32, a second coil 33 wound around the coil bobbin 32a, and a disc-shaped permanent magnet 34 (movable indication member) housed in a second housing pit 31b formed in the casing member 31 on the front side of the first housing pit 31a.

A hole 12d extending in the front-back direction is formed in the clamping plate 12 on the front end near the bottom. The casing member 31 is installed in the hole 12d. The first cylindrical housing pit 31a is formed in the casing member 31 in the back. Formed in the casing member 31 on the front (entrance) side of the first housing pit 31a, is the second cylindrical housing pit 31b opened in front. The second housing pit 31b is continued from the first housing pit 31a.

The coil bobbin 32a in which the second Alnico magnet 32 is housed and around which the second coil 33 is wound is housed in the first housing pit 31a. A permanent magnet 34 is housed and can be turned around in the second housing pit 31b. The cover member 35 closing the front of the casing member 31 is fixed to the clamping plate 12 by four screws 35a.

A red-colored indication surface 34a (corresponding to the indicator) is formed on one end face of the permanent magnet 34 and a white-colored indication surface 34b (corresponding to the indicator) is formed on the other end face of the permanent magnet 34. In this embodiment, the red indication surface 34a facing forward indicates the adsorption state and the white indication surface 34b facing forward indicates the non-adsorption state.

As described later, an energizing circuit that energizes the second coil 33 only while the plural first coils 22 of the plural magnet units 13 are energized is provided to the clamping plate 12. When the plural magnet units 13 of the clamping plate 12 are in the adsorption state, the red indication surface 34a of the permanent magnet 34 faces outward in the front as shown in FIG. 8, whereby it is easily known that the magnetic fixing device 10B is in the adsorption state.

Figure 9:
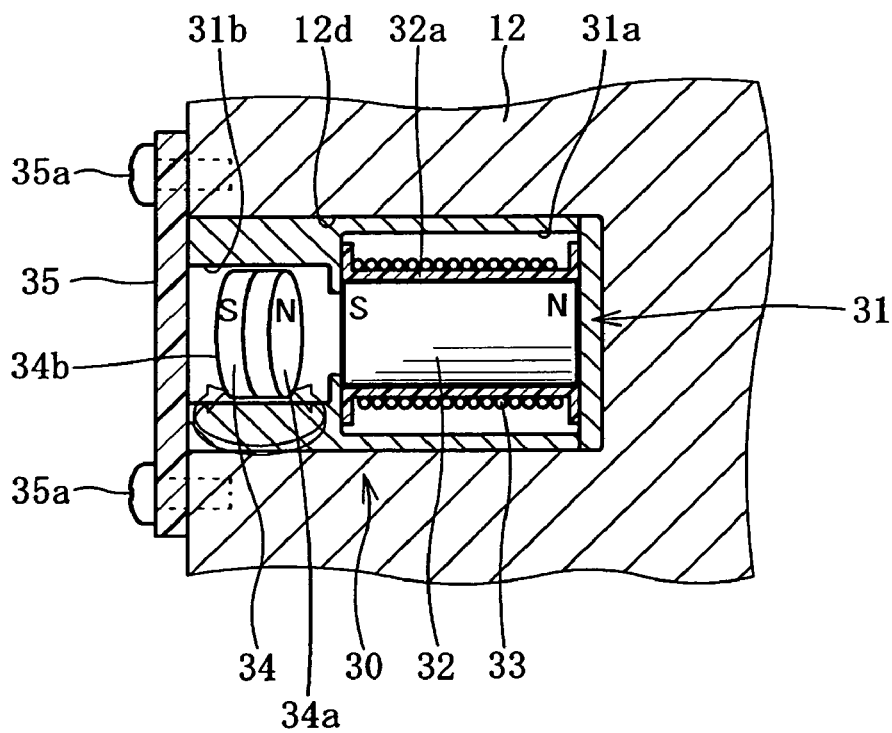
FIG. 9 is a cross-sectional view of the operation state indication mechanism (in the non-adsorption state) provided to the clamping plate.

When the plural first coils 22 of the magnetic fixing device 10B are energized for several seconds to switch the plural magnet units 13 to the non-adsorption state, the second coil 33 is also energized for several seconds to reverse the polarity of the second Alnico magnet 32 and turn the permanent magnet 34 around. Then, the white indication surface 34b of the permanent magnet 34 faces outward in the front as shown in FIG. 9, whereby it is easily known that the magnetic fixing device 10B is in the non-adsorption state. Switching from the non-adsorption state to the adsorption state is done in the same way.

The operation control part 15 will be described next.

Figure 10:
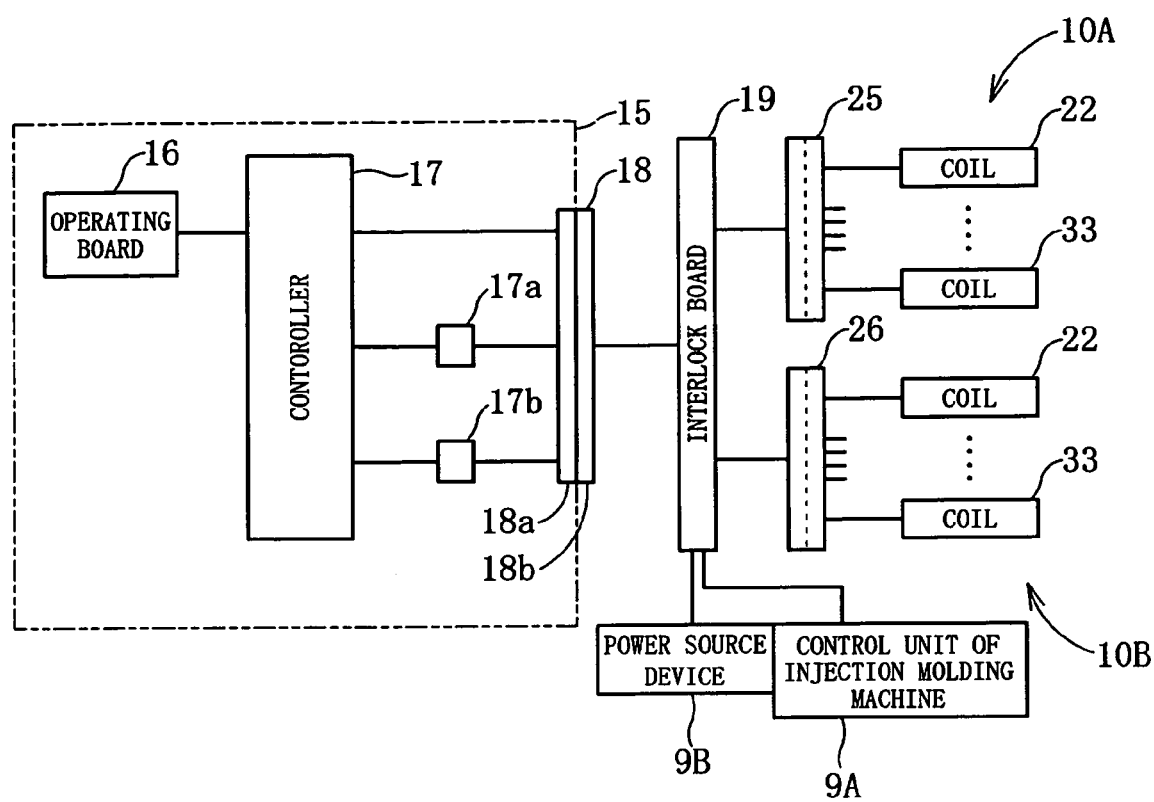
FIG. 10 is a block diagram of the control system of the operation control part and magnetic fixing device.

As shown in FIG. 10, the operation control part 15 has an operation panel 16, a control part 17, a drive circuit 17a simultaneously driving the first and second coils 22 and 33 of the clamping plate 11, a drive circuit 17b simultaneously driving the first and second coils 22 and 33 of the clamping plate 12, and a male connector part 18a of a connector 18. The control part 17 has a computer including a CPU, a ROM, and a RAM and an input/output interface. Necessary control programs are stored in the ROM.

The injection molding machine 1 is provided with a female connector part 18b (common connector) of the connector 18 and an interlock board 19 for the magnetic fixing devices 10A and 10B. The interlock board 19 is connected to the plural first coils 22 and one second coil 33 of the magnetic fixing device 10A via a connector 25 and to the plural first coils 22 and one second coil 33 of the magnetic fixing device 10B via a connector 26.

The operation control part 15 is of a transportable type with castors for shared use by plural injection molding devices 1. The plural injection molding machines 1 each have the aforementioned common female connector part 18b. For replacing the mold M, the operation control part 15 is moved to near the injection molding machine 1 and the male connector part 18a is connected to the female connector part 18b, whereby the magnetic fixing devices 10A and 10B are operable through the operation control part 15.

A molding machine control unit 9A and a power unit 9B are connected to the interlock board 19. The molding machine control unit 9A controls various mechanisms regarding injection such as the platen drive mechanism 4, injection mechanism 6, and eject mechanism 7 of the injection molding machine 1. The molding machine control unit 9A has a computer including a CPU, a ROM, and a RAM and an input/output interface. Necessary control programs are stored in the ROM.

The molding machine control unit 9A receives plural signals from plural sensors provided to various mechanisms regarding injection molding, and determines whether or not conditions necessary for safely fixing or unfixing the mold M are satisfied based on the plural signals. When the conditions are satisfied, the molding machine control unit 9A sends operation permission signals indicating that the magnetic fixing devices 10A and 10B are operable to the operation control part 15 via the interlock board 19. The interlock board 19 has a power circuit. The alternate current supplied to the interlock board 19 from the power unit 9B is converted to a direct current by the power circuit. The direct current is supplied to the operation control part 15 via the connector 18 and to the plural first coils 22 and two second coils 33 of the magnetic fixing devices 10A and 10B via the drive circuits 17a and 17b.

Functions and advantages of the magnetic fixing devices 10A and 10B will be described hereafter.

Figure 7:
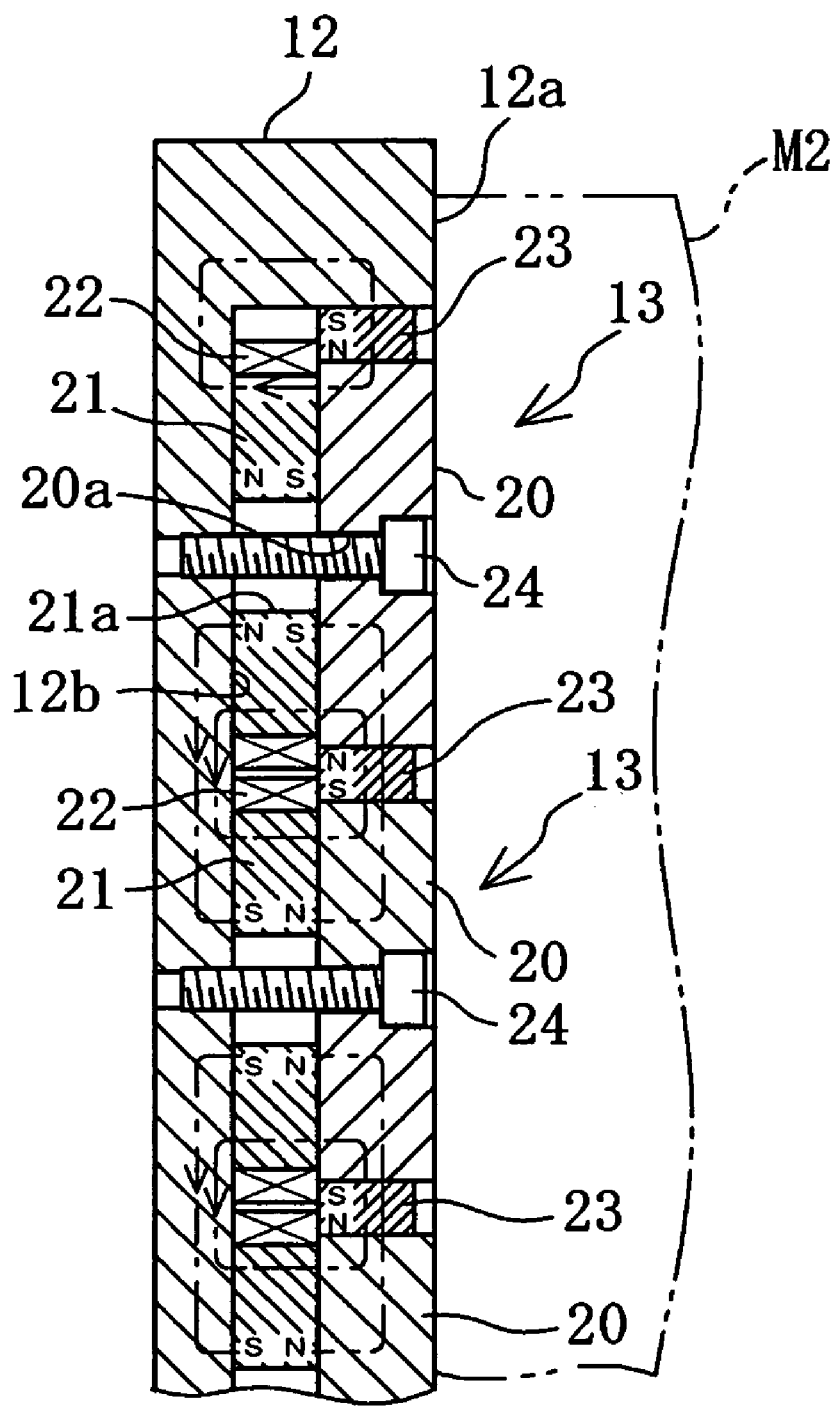
FIG. 7 is a cross-sectional view of the clamping plate (in the non-adsorption state) provided to the platen.

For fixing the molds M1 and M2 to the platens 2 and 3 using the magnetic fixing devices 10A and 10B, first, the connector 18 is connected to connect the operation control part 15 to the interlock board 19 while the mold M is conveyed to between the platens 2 and 3 using a conveying means such as a crane. Here, the plural magnet units 13 of the clamping plates 11 and 12 are in the non-adsorption state as shown in FIG. 7 so that the magnetic force does not work on the mold M. Here, with the white indication surface 34b facing forward as shown in FIG. 9, the operation state indication mechanism 30 indicates the non-adsorption state.

Then, the molds M1 and M2 are positioned and placed in contact with the fixing surfaces 11a and 12a of the clamping plates 11 and 12, respectively, and the circular projection of the mold M1 is fitted in the locating ring 11c of the fixing surface Ha for centering. Then, for fixing the molds M1 and M2 to the fixing surfaces 11a and 12a, the operation panel 16 of the operation control part 15 is operated so that the control part 17 supplies the electric power to energize the plural first coils 22 for several seconds with a current in the direction leading to the adsorption state. Then, the polarity of the first Alnico magnets 21 is switched as shown in FIG. 6 and a magnetic circuit of which the magnetic path is partly formed by the mold M is established. In this way, the molds M1 and M2 are adsorbed and fixed to the fixing surfaces 11a and 12a.

Meanwhile, the second coils 33 of the clamping plates 11 and 12 are also energized for several seconds to switch the polarity of the second Alnico magnet 32 at the same time as the above operation. Then, as shown in FIG. 8, the permanent magnet 34 is turned around and the operation state indication mechanism 30 shows the red indication surface 34a. In this way, the operator can easily know that the magnet units 13 are in the adsorption state. Then, the connector 18 is disconnected and the operation control part 15 is moved to another injection molding machine 1 for use.

On the other hand, for releasing the molds M1 and M2 from the fixing surfaces 11a and 12a of the clamping plates 11 and 12, the connector 18 is connected to connect the operation control part 15 to the interlock board 19. Then, the operation control part 15 is operated to energize the plural first coils 22 for several seconds with a current in the opposite direction to that for fixing the molds M1 and M2. Then, the polarity of the Alnico magnets 21 is reversed as shown in FIG. 7 to switch to the non-adsorption state. The two second coils 33 are simultaneously energized to switch to the state shown in FIG. 9.

In this way, the operator can easily know that the magnet units 13 are in the non-adsorption state. Then, the connector 18 is disconnected and the operation control part 15 is moved to another injection molding machine 1 for use.

As described above, the operation state indication mechanism 30 capable of presenting an indicator indicating that the plural magnet units 13 are in the adsorption state or in the non-adsorption state is provided on the outer peripheries of the clamping plates 11 and 12, whereby the operator can easily know whether the plural magnet units 13 are in the adsorption state or in the non-adsorption state. Particularly, the operation control part 15 for attaching/detaching the mold is not provided to each injection molding machine 1, but is shared by plural injection molding machines 1. Therefore, the operator can easily know whether the plural magnet units 13 are in the adsorption state or in the non-adsorption state even after the operation control part 15 is disconnected from the injection molding machine 1.

Partial modifications of the above described Embodiment 1 will be described hereafter.

[1] When the magnetic fixing devices 10A and 10B are configured to use some of the plural magnet units 13 for adsorbing a small mold, the operation state indication mechanism 30 can be configured to indicate that those some of the plural magnet units 13 are in the adsorption state or in the non-adsorption state.

[2] The operation state indication mechanism 30 can be configured to present the indication on the fixing surfaces 11a and 12a of the clamping plates 11 and 12.

[3] The operation control part 15 and operation state indication mechanism 30 can be provided nearly in the same manner as described above even if the clamping plates 11 and 12 are omitted and the magnetic fixing devices 10A and 10B are installed in the platens 2 and 3. In such a case, the platens 2 and 3 correspond to the clamping plates.

[4] In some cases, the operation control part 15 shown in FIG. 10 is omitted, the operation panel 16 and control part 17 are normally connected to the interlock board 19, and the drive circuits 17a and 17b are provided to the interlock board 19.

Figure 11:
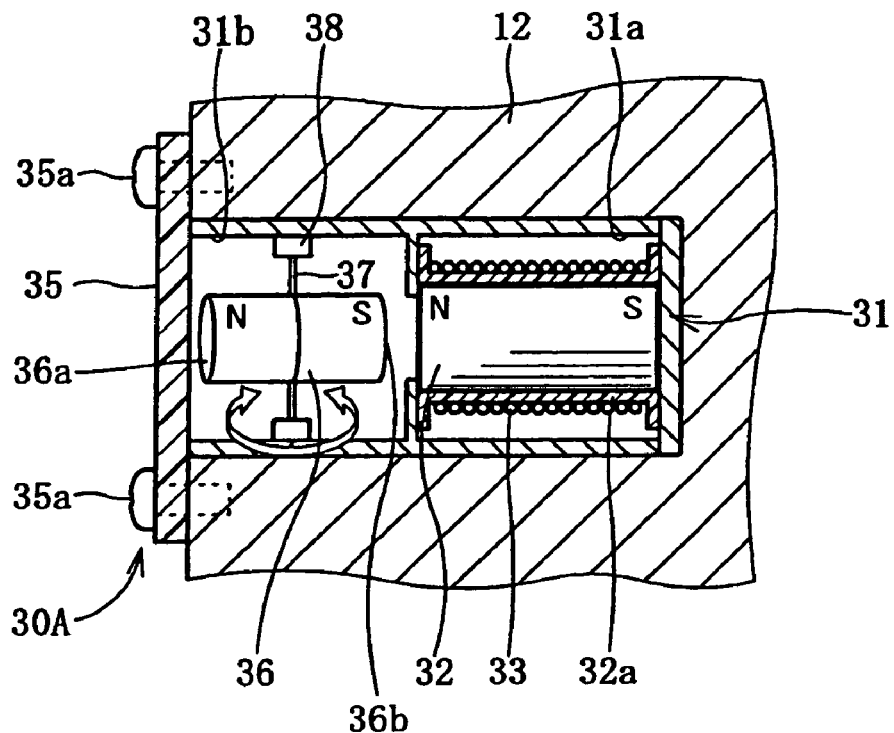
FIG. 11 is a cross-sectional view of the operation state indication mechanism (in the adsorption state) of a modified embodiment.

[5] As shown in FIG. 11, an operation state indication mechanism 30A has, as the movable indication member, a cylindrical permanent magnet 36 that can be turned around in the second housing pit 31b. A red-colored indication surface 36a is formed on one, N pole, end of the permanent magnet 36 and a white-colored indication surface 36b is formed on the other, S pole, end of the permanent magnet 36. The red indication surface 36a indicates the adsorption state and the white indication surface 36b indicates the non-adsorption state. The permanent magnet 36 is rotatably supported by a pin member 37 and a pair of support parts 38 at the longitudinal midpoint.

Figure 12:
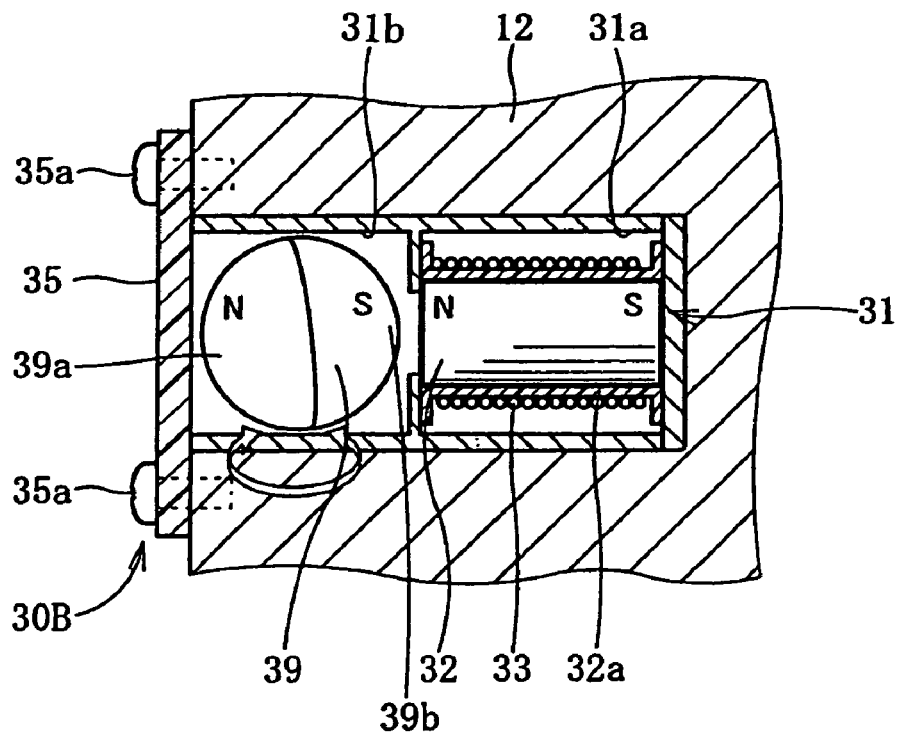
FIG. 12 is a cross-sectional view of the operation state indication mechanism (in the adsorption state) of another modified embodiment.

[6] As shown in FIG. 12, an operation state indication mechanism 30B has, as the movable indication member, a spherical permanent magnet 39 that can be turned around in the second housing pit 31b. A red-colored indication surface 39a is formed on one, N pole, half of the permanent magnet 39 and a white-colored indication surface 39b is formed on the other, S pole, half of the permanent magnet 39. The red indication surface 39a indicates the adsorption state and the white indication surface 39b indicates the non-adsorption state.

Figure 13:
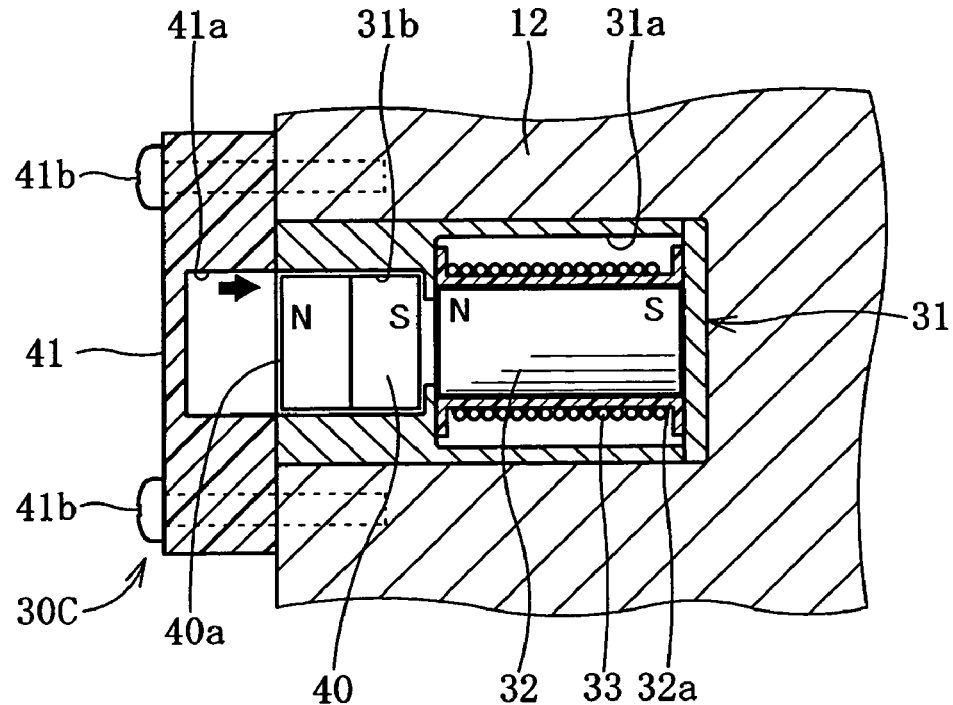
FIG. 13 is a cross-sectional view of the operation state indication mechanism (in the non-adsorption state) of another modified embodiment.
Figure 14:
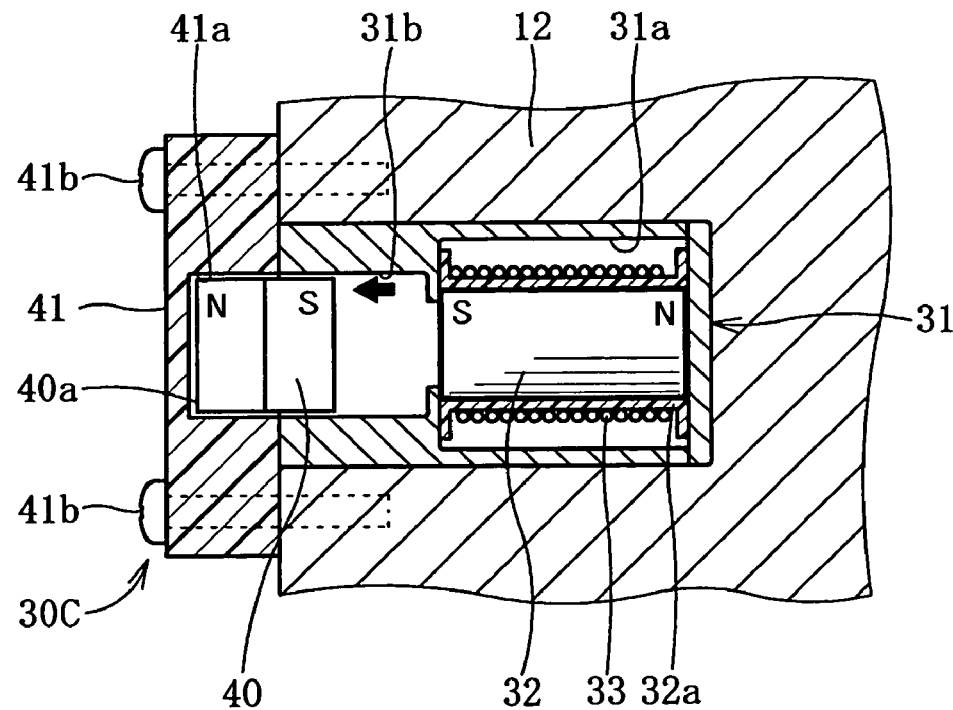
FIG. 14 is a cross-sectional view of the operation state indication mechanism (in the adsorption state) of the modified embodiment in FIG. 13.

[7] As shown in FIGS. 13 and 14, the casing member 31 of an operation state indication mechanism 30C has a second housing pit 31b opening in the front. A thick transparent acrylic resin cover member 41 has a hole 41a opening in the back. The cover member 41 is fixed to the clamping plate 12 by four screws 41b. The second housing pit 31b is continued to the hole 41a.

A cylindrical permanent magnet 40 axially movably housed in the second housing pit 31b and hole 41a is provided as the movable indication member. A red-colored indication part 40a is formed on one, N pole, end of the permanent magnet 40 and the other, S pole, end is colored in white. The permanent magnet 40 is retracted as shown in FIG. 13 when the magnetic fixing devices 10A and 10B are in the non-absorption state. The permanent magnet 40 is advanced and the red indication part 40a is presented in the front as shown in FIG. 14 when the magnetic fixing devices 10A and 10B are in the absorption state.

Figure 15:
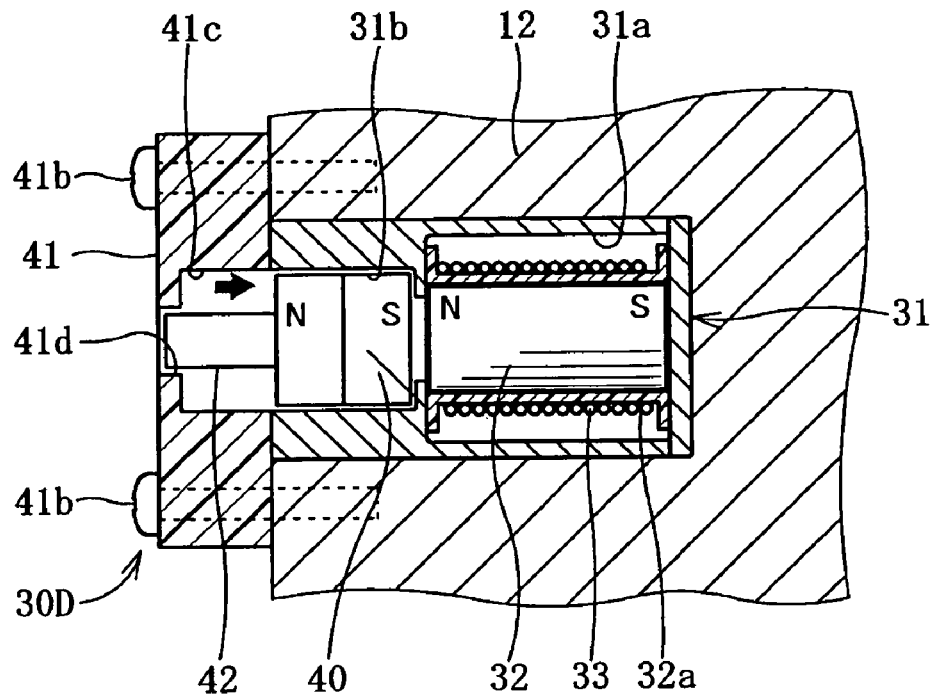
FIG. 15 is a cross-sectional view of the operation state indication mechanism (in the non-adsorption state) of another modified embodiment.
Figure 16:
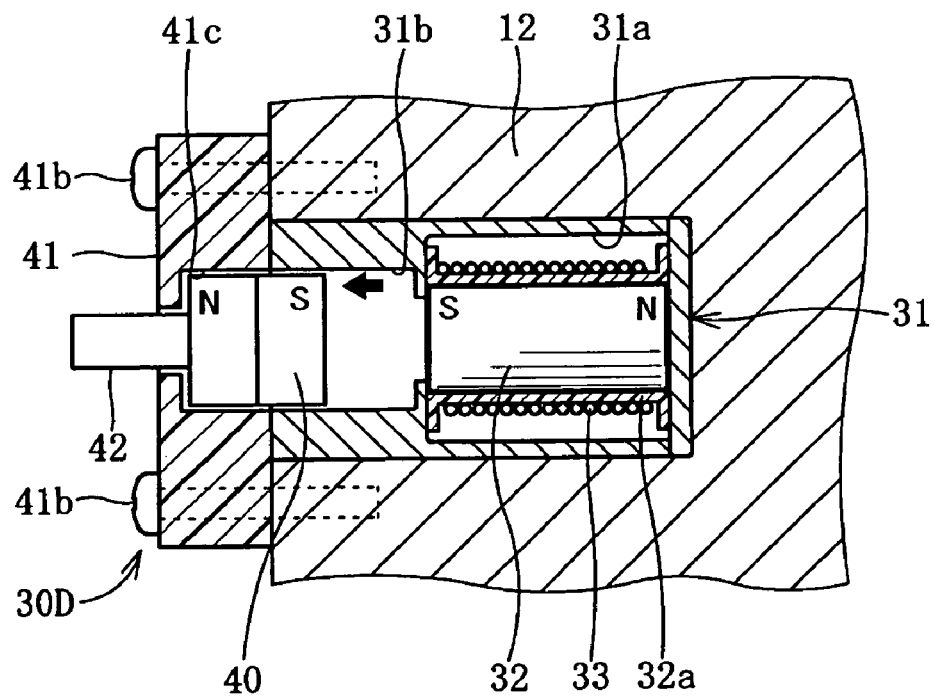
FIG. 16 is a cross-sectional view of the operation state indication mechanism (in the adsorption state) of the modified embodiment in FIG. 15.

[8] As shown in FIGS. 15 and 16, in an operation state indication mechanism 30D, a cover member 41 has a first hole 41c continued to the front end of the second housing pit 31b and a second hole 41d opening in the front. A cylindrical permanent magnet 40 movably housed in the second housing pit 31b and first hole 41c is provided as the movable indication member. A red indicator rod 42 as the red indication part is fixed to the front end of the permanent magnet 40. The permanent magnet 40 and indicator rod 42 are retracted as shown in FIG. 15 when the magnetic fixing devices 10A and 10B are in the absorption state. The permanent magnet 40 and indicator rod 42 are advanced and the indicator rod 42 protrudes from the second hole 41d as shown in FIG. 16 when the magnetic fixing devices 10A and 10B are in the non-absorption state.

Embodiment 2

Figure 17:
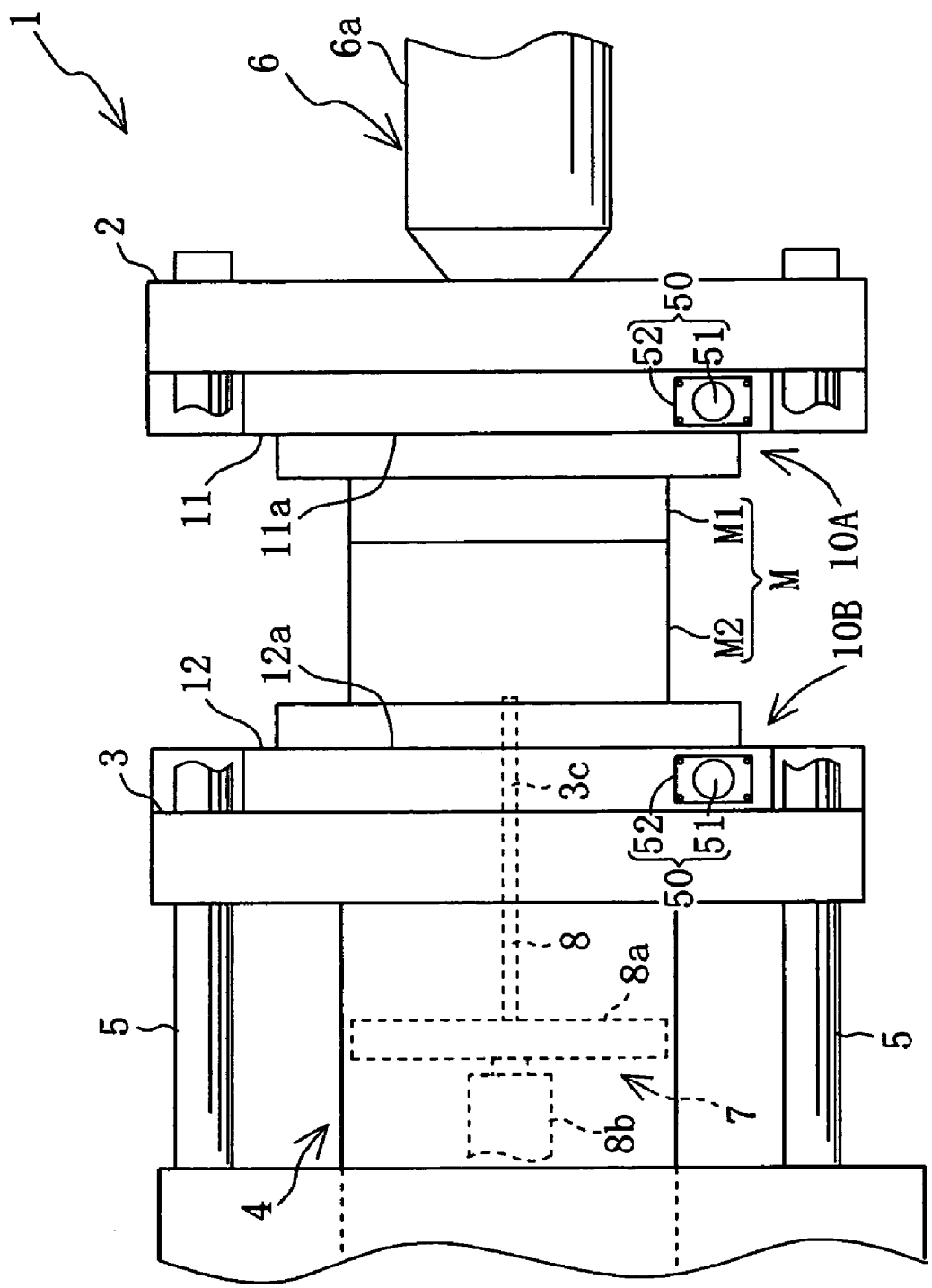
FIG. 17 is a front view of the essential part of the injection molding machine of Embodiment 2 and a mold.

The magnetic fixing devices 10A and 10B of Embodiment 2 will be described hereafter. Here, the same structures as in Embodiment 1 are referred to by the same reference numbers and their explanation is omitted. As shown in FIG. 17, in place of the operation state indication device 30, an operation state indication device 50 is provided at the same positions of the clamping plates 11 and 12. The operation state indication device 50 has an indicator lamp 51 and a casing member 52 housing the indicator lamp 51. The indicator lamp 51 emits a red light when the magnetic fixing devices 10A and 10B are in the adsorption state and a green light when they are in the non-adsorption state. An operation control part for operating and controlling the indicator lamp 51 is also provided.

Embodiment 3

Figure 18:
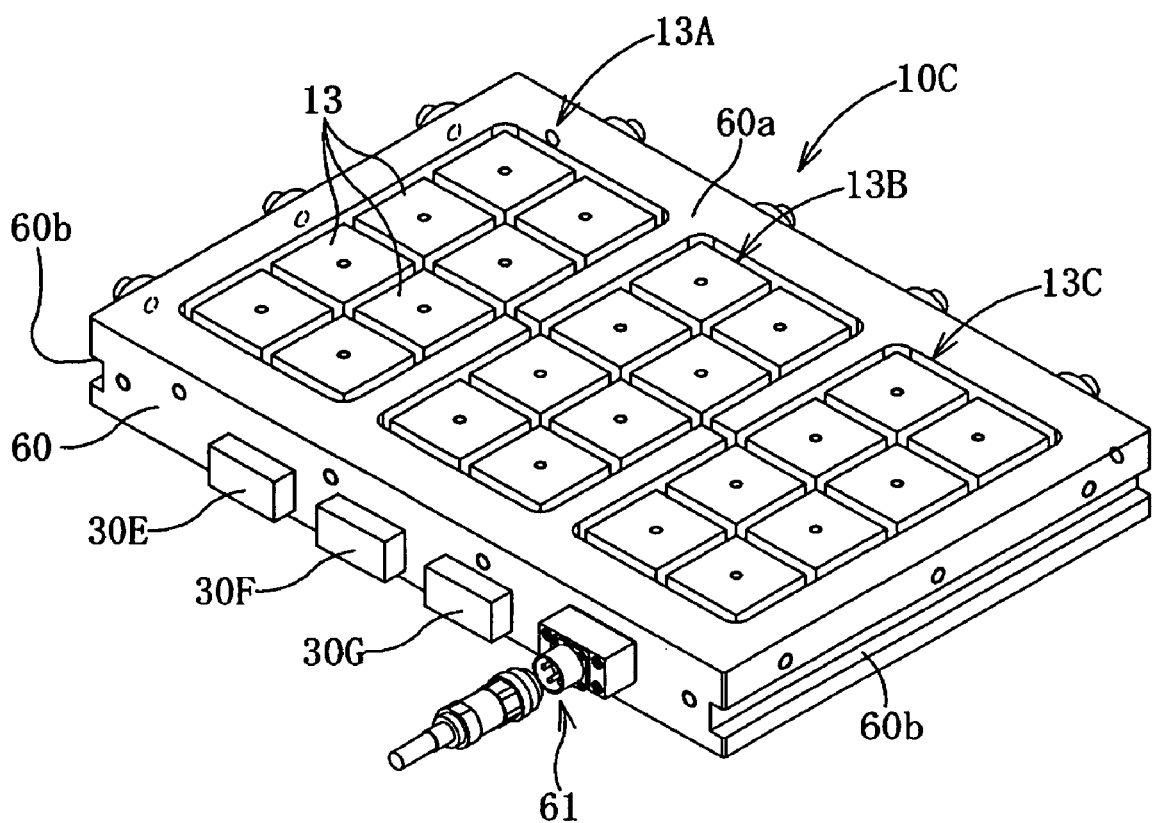
FIG. 18 is a perspective view of the magnetic fixing device of Embodiment 3.

A magnetic fixing device 10C of Embodiment 3 will be described hereafter. Here, the same components as in Embodiment 1 are referred to by the same reference numbers and their explanation is omitted. As shown in FIG. 18, the magnetic fixing device 10C is placed and fixed, for example, on the table of a machining center to adsorb and fix by magnetic force a work pallet (clamping object) on which one or more work pieces to be machined is fixed.

The magnetic fixing device 10C has a clamping plate 60 having a fixing surface 60a, plural magnet units 13 provided to the clamping plate 60 and generating adsorptive power by magnetic force, and operation state indication mechanisms 30E to 30G provided on the front end (outer periphery) of the clamping plate 60 and presenting indicators indicating that the plural magnet units 13 are in the adsorption state or in the non-adsorption state.

The clamping plate 60 is a magnetic steel plate. A connector 61 for connection to the operation control part is provided at the front end of the clamping plate 60. Rail grooves 60b engaging with the guide rails on the table are formed on the right and left ends of the clamping plate 60. Three magnet unit sets 13A, 13B, and 13C each consisting of eight magnet units 13 are arranged on the clamping plate 60.

The operation state indication mechanisms 30E, 30F, and 30G indicate the operation states of the magnet unit sets 13A, 13B, and 13C, respectively. The operation state indication mechanisms 30E, 30F, and 30G are each the same as the operation state indication mechanism 30.

Other than the magnetic fixing device 10C, the present invention can be applied to a magnetic fixing device for fixing a work piece on a work pallet. Furthermore, the present invention can be realized by a person of ordinary skill in the field by modifying the above described embodiments without departing from the scope of the present invention.

INDUSTRIAL APPLICABILITY

The present invention is applicable to various magnetic fixing devices having one or plural magnetic force generation mechanisms (magnet units) installed in the clamping plate for fixing a metal mold or a work piece. The present invention presents indicators indicating that the magnetic force generation mechanisms are in the adsorption state or in the non-adsorption state, improving productivity and safety.

What is claimed is:

1. A magnetic fixing device comprising a clamping plate having a fixing surface for fixing a clamping object such as a mold and plural magnetic force generation mechanisms installed in the clamping plate for fixing the clamping object to the fixing surface by magnetic force,
    wherein each of said magnetic force generation mechanisms comprises a magnetic material member facing said fixing surface, plural permanent magnets arranged around an outer periphery of said magnetic material member, a first Alnico magnet provided on a back of said magnetic material member, and a first coil for switching a polarity of said first Alnico magnet, and can be switched between an absorption state in which the clamping object is adsorbed and a non-absorption state in which the clamping object is not adsorbed,
    an operation state indication mechanism capable of presenting an indicator indicating that said plural magnetic force generation mechanisms are in the adsorption state or in the non-adsorption state is provided on the fixing surface or outer periphery of said clamping plate and comprises a second Alnico magnet, a second coil electrically connected to said first coil in parallel wound around said second Alnico magnet, and a movable indication member made from a permanent magnet, and
    an energizing circuit that energizes said second coil only while said first coils of said plural magnetic force generation mechanisms are energized is provided.

2. The magnetic fixing device according to claim 1 wherein said operation state indication mechanism comprises a casing member installed in said clamping plate, a transparent cover member closing a front of the casing member, a first housing pit formed in said casing member housing said second Alnico magnet, and a second housing pit formed in said casing member on a front side of the first housing pit and housing said movable indication member.

3. The magnetic fixing device according to claim 2 wherein said movable indication member is made of a disc-shaped permanent magnet that can be turned around in said second housing pit and said indicators are provided on end faces of said disc-shaped permanent magnet.

4. The magnetic fixing device according to claim 2 wherein said movable indication member is made of a cylindrical permanent magnet that can be turned around in said second housing pit, said indicators are provided on end faces of said cylindrical permanent magnet, and a pin member rotatably supporting said cylindrical permanent magnet at the longitudinal midpoint is provided.

5. The magnetic fixing device according to claim 2 wherein said movable indication member is made of a cylindrical permanent magnet housed in said second housing pit in a manner that is axially movable by a predetermined stroke and said indicators are provided on end faces of the cylindrical permanent magnet.

6. The magnetic fixing device according to any of claims 1 to 5 wherein said magnetic fixing device is mounted on a platen of an injection molding machine.

7. A magnetic fixing device comprising:
    a clamping plate having a fixing surface for fixing a clamping object such as a mold;
    plural magnetic force generation mechanisms installed in the clamping plate for fixing the clamping object to the fixing surface by magnetic force;
    an operation state indication mechanism; and
    an energizing circuit;
    wherein each of said magnetic force generation mechanisms comprises:
        a magnetic material member facing said fixing surface;
        plural permanent magnets arranged around an outer periphery of said magnetic material member;
        a first Alnico magnet provided on a back of said magnetic material member; and
        a first coil for switching a polarity of said first Alnico magnet;
    wherein each of the magnetic force generation mechanisms can be switched between an absorption state in which the clamping object is adsorbed and a non-absorption state in which the clamping object is not adsorbed;
    wherein said operation state indication mechanism is capable of presenting an indicator indicating that said plural magnetic force generation mechanisms are in the adsorption state or in the non-adsorption state, and is provided on the fixing surface or outer periphery of said clamping plate;
    wherein said operation state indication mechanism comprises:
        a casing member installed in said clamping plate;
        a transparent cover member closing a front of the casing member;
        a first housing pit formed in said casing member;
        a second Alnico magnet housed in the first housing pit;
        a second coil wound around the second Alnico magnet; and
        a movable indication member consisting of a permanent magnet housed in a second housing pit formed in said casing member on a front side of the first housing pit; and wherein the energizing circuit energizes the second coil only while the plural first coils of said plural magnetic force generation mechanisms are energized.

8. The magnetic fixing device according to claim 7, wherein said movable indication member is made of a disc-shaped permanent magnet that can be turned around in said second housing pit and said indicators are provided on end faces of said disc-shaped permanent magnet.

9. The magnetic fixing device according to claim 7, wherein said movable indication member is made of a cylindrical permanent magnet that can be turned around in said second housing pit, said indicators are provided on end faces of said cylindrical permanent magnet, and a pin member rotatably supporting said cylindrical permanent magnet at the longitudinal midpoint is provided.

10. The magnetic fixing device according to claim 7, wherein said movable indication member is made of a cylindrical permanent magnet housed in said second housing pit in a manner that is axially movable by a predetermined stroke and said indicators are provided on end faces of the cylindrical permanent magnet.

11. The magnetic fixing device according to any of claim 7, wherein said magnetic fixing device is mounted on a platen of an injection molding machine.

12. The magnetic fixing device according to any of claim 8, wherein said magnetic fixing device is mounted on a platen of an injection molding machine.

13. The magnetic fixing device according to any of claim 9, wherein said magnetic fixing device is mounted on a platen of an injection molding machine.

14. The magnetic fixing device according to any of claim 10, wherein said magnetic fixing device is mounted on a platen of an injection molding machine.

* * * * *